(12) United States Patent
Tatsumi

(10) Patent No.: US 9,362,739 B2
(45) Date of Patent: Jun. 7, 2016

(54) PROTECTIVE CIRCUIT, ELECTRONIC DEVICE, AND METHOD OF DRIVING A PROTECTIVE CIRCUIT

(71) Applicant: Sony Corporation, Tokyo (JP)

(72) Inventor: Takaaki Tatsumi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 117 days.

(21) Appl. No.: 14/221,888

(22) Filed: Mar. 21, 2014

(65) Prior Publication Data

US 2014/0293492 A1 Oct. 2, 2014

(30) Foreign Application Priority Data

Apr. 1, 2013 (JP) ................................. 2013-075998

(51) Int. Cl.
*H02H 1/00* (2006.01)
*H02H 1/04* (2006.01)
*H02H 9/00* (2006.01)
*H02H 9/04* (2006.01)

(52) U.S. Cl.
CPC ..................................... *H02H 9/046* (2013.01)

(58) Field of Classification Search
CPC .......... H02H 9/04; H02H 9/046; H02H 9/041

USPC ........................................................... 361/56
See application file for complete search history.

(56) References Cited

U.S. PATENT DOCUMENTS

2012/0236448 A1* 9/2012 Hiraoka ................. H02H 9/046
   361/56
2012/0307405 A1* 12/2012 Chen ...................... H02H 9/046
   361/56

FOREIGN PATENT DOCUMENTS

JP 2008-098587 4/2008

* cited by examiner

*Primary Examiner* — Dharti Patel
(74) *Attorney, Agent, or Firm* — Dentons US LLP

(57) ABSTRACT

Provided is a method of driving a protective circuit, the protective circuit including a first clamp section and a second clamp section, the first clamp section including a first device, the first clamp section being configured to protect an entire protected circuit of a predetermined area when the first device is driven, the second clamp section including a second device, the second clamp section being configured to protect a predetermined device of the protected circuit when the second device is driven, the method comprising: connecting a predetermined spot of the first clamp section and the gate of the second device of the second clamp section; and causing the gate voltage of the second device to be the potential of the predetermined spot.

8 Claims, 12 Drawing Sheets

PROTECTIVE CIRCUIT, ELECTRONIC DEVICE, AND METHOD OF DRIVING A PROTECTIVE CIRCUIT

BACKGROUND

The present disclosure relates to a protective circuit, which is configured to protect a circuit from electrostatic discharge resulting from static electricity from the outside. The present disclosure also relates to an electronic device including the protective circuit, and a method of driving the protective circuit.

Wiring embedded in semiconductor integrated circuits such as LSIs (Large Scale Integrations) is becoming finer. Drive voltages of the semiconductor integrated circuits are becoming lower. In general, as a result, it is becoming more important to protect embedded circuits from surge currents. The surge current occurs in a power-source line in the semiconductor integrated circuits. Note that, in the present specification, an embedded circuit to be protected will be referred to as "protected circuit".

ESD surge is known as a typical surge current, which occurs in a power-source line. The following phenomenon is referred to as ESD surge. That is, electro-static discharge (ESD) to a terminal outside of a power-source line increases a voltage of the power-source line suddenly.

In the past, protective circuits, i.e., so-called global clamp and local clamp, are known. Such protective circuits are configured to protect protected circuits from ESD surge. The global clamp is also referred to as primary clamp. The global clamp provides the following technology. That is, a protective circuit is provided between a power-source line and a ground potential section. As a result, the entire circuit of a predetermined area is protected. The local clamp is also referred to as secondary clamp. The local clamp provides the following technology. That is, the local clamp protects the predetermined protected circuit. The local clamp plays a supplementary role to the global clamp.

For example, in a circuit including a global clamp, when ESD surge flows in a power-source line, devices of a global clamp are driven. Then, a surge current is caused to flow to the ground potential side. Here, a path in which a surge current flows includes a resistance. Because of this, if the amount of current increases, a potential difference occurs between the both ends of the path. If the potential difference increases, the gate potential of a transistor of a protected circuit increases. As a result, a transistor is destroyed.

In order not to destroy devices as described above, a local clamp is provided. If a local clamp is provided, for example, in a case where the gate potential of a transistor of a protected circuit increases and reaches a predetermined voltage or more, devices of the local clamp are driven. As a result, the gate potential of the transistor may decrease.

Japanese Patent Application Laid-open No. 2008-98587 discloses that a MOS transistor (field-effect transistor) plays a role of a local clamp.

SUMMARY

By the way, in the case where a local clamp is a MOS transistor, it is necessary to drive the MOS transistor before a gate oxide film of a MOS transistor of a protected circuit is destroyed, and to flow a surge current. That is, the drive-start voltage of a MOS transistor as a local clamp should be lower than the resistance voltage of a gate oxide film of a MOS transistor of a protected circuit.

Meanwhile, in a semiconductor integrated circuit, as a drive voltage becomes lower and devices become smaller, a gate oxide film of a MOS transistor becomes thinner and a resistance voltage becomes lower. Further, also in a case where it is necessary to drive a protected circuit faster, a MOS transistor having a thinner gate oxide film may be used. As described above, a gate oxide film of a MOS transistor becomes thinner. Because of this, it is difficult to make the drive-start voltage of a MOS transistor as a local clamp lower than the resistance voltage of a gate oxide film of a MOS transistor of a protected circuit. In view of this, it is more and more difficult to realize a local clamp, which may protect a protected circuit reliably.

In view of the above-mentioned circumstances, it is desirable to provide a protective circuit, which may protect a protected circuit reliably even in a case where the resistance voltage of devices of a protected circuit is low.

According to an embodiment of the present disclosure, there is provided a protective circuit, including:

a first clamp section connected between a first line and a second line, a power-supply voltage being supplied to the first line, the second line being the ground potential, the first clamp section including a first device, the first device being configured to be driven in a case where a voltage value of the first device exceeds a predetermined voltage value, the first clamp section being configured to cause a surge current flowing in the first line to flow to the second line when the first device is driven;

a second clamp section including a second device, the second device being connected with the gate of a protected device, the second clamp section being configured to cause a surge current supplied to the gate of the protected device to flow to one of the first line and the second line when the second device is driven; and a third line connecting a predetermined spot of the first clamp section and the gate of the second device of the second clamp section, whereby a gate voltage of the second device is equal to a potential of the predetermined spot.

According to an embodiment of the present disclosure, there is provided an electronic device, including:

a protected circuit connected between a first line and a second line, a power-supply voltage being supplied to the first line, the second line being the ground potential;

a first clamp section connected between the first line and the second line, the first clamp section including a first device, the first device being configured to be driven in a case where a voltage value of the first device exceeds a predetermined voltage value, the first clamp section being configured to cause a surge current flowing in the first line to flow to the second line when the first device is driven;

a second clamp section including a second device, the second device being connected with the gate of a protected device of the protected circuit, the second clamp section being configured to cause a surge current supplied to the gate of the protected device to flow to one of the first line and the second line when the second device is driven; and a third line connecting a predetermined spot of the first clamp section and the gate of the second device of the second clamp section, whereby a gate voltage of the second device is equal to a potential of the predetermined spot.

According to an embodiment of the present disclosure, there is provided a method of driving a protective circuit, the protective circuit including a first clamp section and a second clamp section, the first clamp section including a first device, the first clamp section being configured to protect an entire protected circuit of a predetermined area when the first device is driven, the second clamp section including a second device, the second clamp section being configured to protect a predetermined device of the protected circuit when the second device is driven, the method including:

connecting a predetermined spot of the first clamp section and the gate of the second device of the second clamp section; and causing the gate voltage of the second device to be the potential of the predetermined spot.

According to the embodiments of the present disclosure, surge current flows to the first line, which is the power-supply voltage. In this case, the first device of the first clamp section is driven. Then, surge current flows from the first line, which is the power-supply voltage, to the second line, which is the ground potential. When the first clamp section is driven, the potential of a predetermined spot of the first clamp section increases. The gate voltage of the second device of the second clamp section also increases via the third line. In the state where the gate voltage of the second device increases, the second device functions as a protective device effectively.

According to the embodiments of the present disclosure, when a surge current flows, the gate voltage of a protective device, which protects a predetermined device, increases. The protective device is a so-called local clamp. The predetermined device may be protected reliably. In this case, it is not necessary to provide a special device in order to increase the gate voltage. The gate voltage may increase by means of a simple configuration.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings in the following order.

1. First embodiment
    1-1. Circuit configuration (FIG. 1)
    1-2. Behaviors at the time of ESD surge generation (FIG. 2 and FIG. 3)
    1-3. Modification 1 (FIG. 4)
    1-4. Modification 2 (FIG. 5)
    1-5. Modification 3 (FIG. 6)
2. Second embodiment
    2-1. Circuit configuration (FIG. 7)
    2-2. Behaviors at the time of ESD surge generation (FIG. 8)
    2-3. Modification 1 (FIG. 9)
3. Third embodiment
    3-1. Circuit configuration (FIG. 10)
    3-2. Behaviors at the time of ESD surge generation (FIG. 10 and FIG. 11)
    3-3. Modification 1 (FIG. 12)
4. Other modifications <1. First Embodiment>
[1-1. Circuit Configuration]

Figure 1:
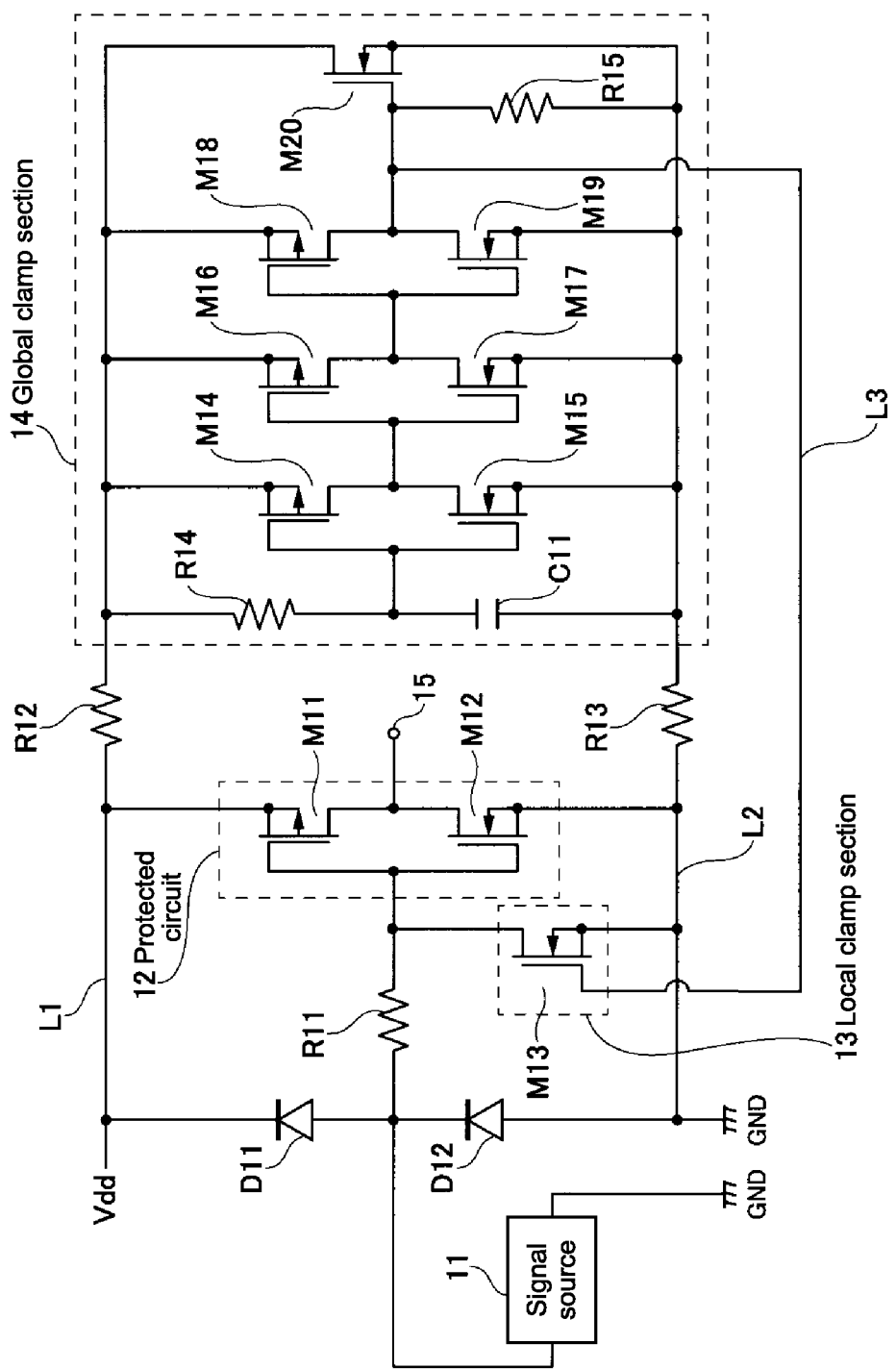
FIG. 1 is a circuit diagram of a first embodiment of the present disclosure.

FIG. 1 is a circuit diagram of the first embodiment of the present disclosure. An electronic device includes a built-in semiconductor device such as, for example, an LSI. The semiconductor device includes the circuit of FIG. 1. The circuit drives the electronic device.

In the circuit of FIG. 1, the signal source 11 outputs a signal, and supplies the connection point with the signal. The connection point connects the two diodes D11 and D12 in series. The series circuit, which includes the two diodes D11 and D12, is connected between a line L1 and a line L2. The line L1 is the power-supply voltage Vdd. The line L2 is the ground potential GND.

The protected circuit 12 is connected between the line L1, which is the power-supply voltage Vdd, and the line L2, which is the ground potential GND. In the example of FIG. 1, the protected circuit 12 is an inverter circuit, which includes the two MOS transistors M11 and M12. The MOS transistor M11 is a P-channel MOS transistor. The MOS transistor M12 is an N-channel MOS transistor. The line L1 is connected with the source of the MOS transistor M11. The drain of the MOS transistor M11 is connected with the drain of the MOS transistor M12. The source of the MOS transistor M12 is connected with the line L2.

The protected circuit 12 includes the output terminal 15. The output terminal 15 is drawn from the connection point of the two MOS transistors M11 and M12. The output terminal 15 outputs a signal. The signal source 11 supplies the protected circuit 12 with the signal.

The gate of the MOS transistor M11 is connected with the gate of the MOS transistor M12, and establishes a commonly-connected gate. The commonly-connected gate is connected with the resistor R11. The resistor R11 is connected with the connection point of the diode D11 and the diode D12.

The following configuration has been described above. That is, the signal source 11 outputs a signal. The protected circuit 12, i.e., an inverter circuit, inverts the signal. The output terminal 15 outputs the inverted signal. Further, the configuration of FIG. 1 includes the local clamp section 13 and the global clamp section 14. The local clamp section 13 and the global clamp section 14 are configured to protect the MOS transistors M11 and M12 of the protected circuit 12.

The local clamp section 13 is connected between the commonly-connected gate of the two MOS transistors M11 and M12, and the line L2, which is the ground potential GND. The local clamp section 13 includes the N-channel MOS transistor M13, which is a protective device. The local clamp section 13 is a circuit, which is configured to protect the two MOS transistors M11 and M12 of the protected circuit 12.

The drain of the MOS transistor M13 is connected with the gate of the two MOS transistors M11 and M12. Further, the source of the MOS transistor M13 is connected with the line L2. Further, the gate of the MOS transistor M13 is connected with the global clamp section 14 (described later) side via the line L3.

Further, the global clamp section 14 is connected between the line L1, which is the power-supply voltage Vdd, and the line L2, which is the ground potential GND. Note that the resistor R12 is connected between the line L1 at the protected circuit 12 side and the line L1 at the global clamp section 14 side. The resistor R13 is connected between the line L2 at the protected circuit 12 side and the line L2 at the global clamp section 14 side.

In the global clamp section 14, a series circuit is connected between the line L1 and the line L2. In the series circuit, the resistor R14, i.e., a voltage detection circuit, is connected with the capacitor C11 in series. Further, the connection point of the resistor R14 and the capacitor C11 is connected with the gate of the P-channel MOS transistor M14 and the N-channel MOS transistor M15. The first-stage inverter circuit includes the P-channel MOS transistor M14 and the N-channel MOS transistor M15. That is, the line L1 is connected with the source of the MOS transistor M14. The drain of the MOS transistor M14 is connected with the drain of the MOS transistor M15. The source of the MOS transistor M15 is connected with the line L2. Further, the drain of the two MOS transistors M14 and M15 is connected with the gate of the P-channel MOS transistor M16 and the N-channel MOS transistor M17. The second-stage inverter circuit includes the P-channel MOS transistor M16 and the N-channel MOS transistor M17.

Further, the drain of the MOS transistors M16 and M17 is connected with the gate of the P-channel MOS transistor M18 and the N-channel MOS transistor M19. Here, the second-stage inverter circuit includes the MOS transistors M16 and M17. The third-stage inverter circuit includes the P-channel MOS transistor M18 and the N-channel MOS transistor M19. The MOS transistor M16 of the second-stage inverter circuit is connected with the line L1 just as the MOS transistor M14 of the first-stage inverter circuit is connected with the line L1. The MOS transistor M17 of the second-stage inverter circuit is connected with the line L2 just as the MOS transistor M15 of the first-stage inverter circuit is connected with the line L2. The MOS transistor M18 of the third-stage inverter circuit is connected with the line L1 just as the MOS transistor M14 of the first-stage inverter circuit is connected with the line L1. The MOS transistor M19 of the third-stage inverter circuit is connected with the line L2 just as the MOS transistor M15 of the first-stage inverter circuit is connected with the line L2.

Further, the drain of the MOS transistors M18 and M19 of the third-stage inverter circuit is connected with the gate of the N-channel MOS transistor M20. The global clamp section 14 includes the N-channel MOS transistor M20, which is a protective device.

The drain of the N-channel MOS transistor M20 is connected with the line L1. The source of the N-channel MOS transistor M20 is connected with the line L2. Further, the gate of the MOS transistor M20 is connected with the resistor R15. The resistor R15 is connected with the line L2. Further, the gate of the MOS transistor M20 is connected with the line L3. The line L3 is connected with the gate of the MOS transistor M13 of the local clamp section 13.

[1-2. Behaviors at the Time of ESD Surge Generation]

Next, with reference to FIG. 2 and FIG. 3, behaviors of the circuit of FIG. 1 will be described, in which surge current is supplied to the power source.

Figure 2:
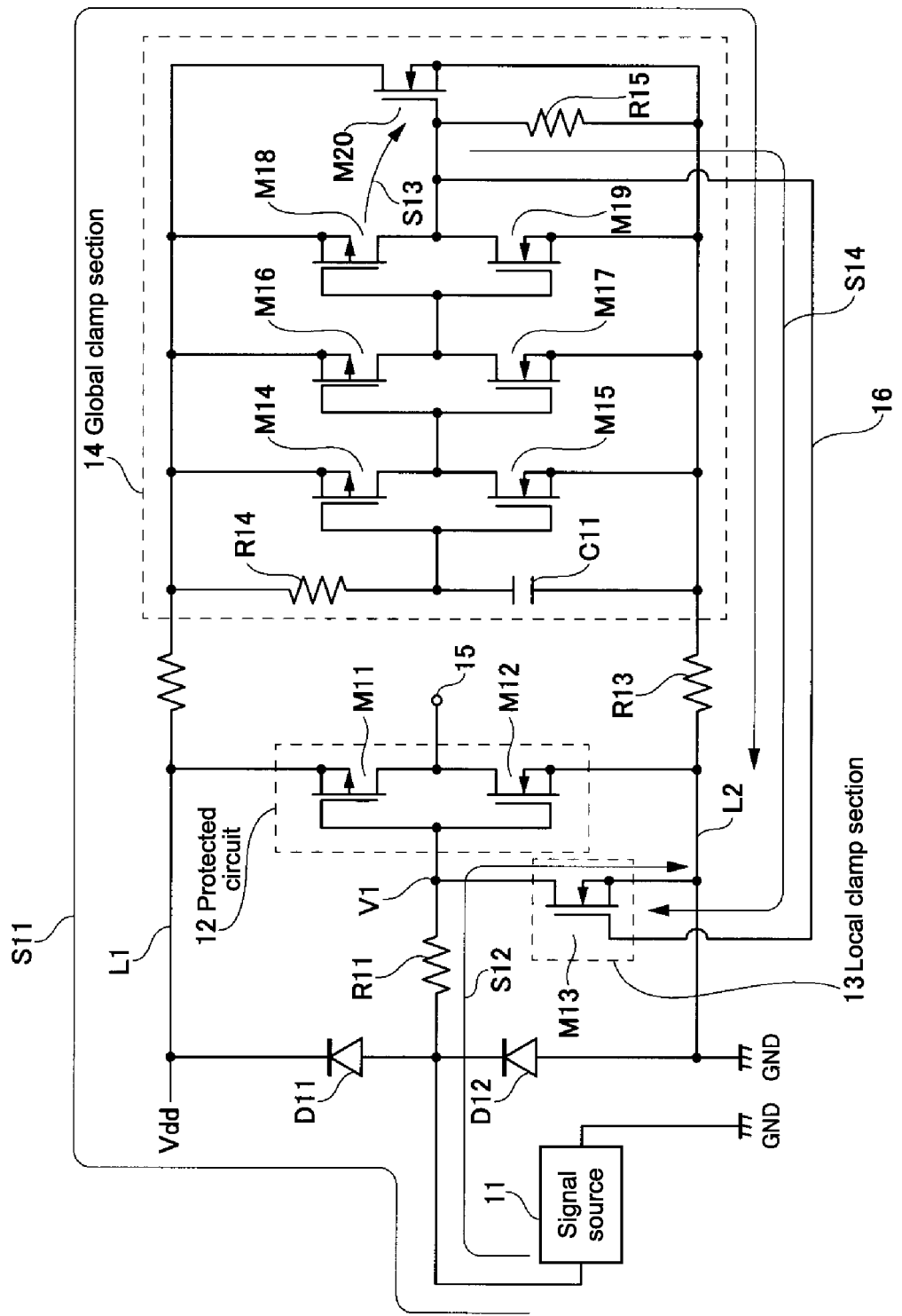
FIG. 2 is a diagram showing a driving status of the example of FIG. 1.

FIG. 2 is a diagram showing the state where ESD surge is caused to flow in the global clamp section 14 and the local clamp section 13 of the circuit of FIG. 1, with reference to the signal paths S11 to S14.

ESD surge is supplied to the line L1, which is the power-supply voltage Vdd. Then the voltage of the line L1 increases. In this case, the increase in voltage is transmitted to the global clamp section 14. Then the MOS transistor M20, i.e., a protective device, of the global clamp section 14 is driven.

That is, the ESD surge is transmitted to the global clamp section 14. Because of this, the potential of the connection point of the resistor R14 and the capacitor C11 of the global clamp section 14 increases. The MOS transistors M14 and M15 of the first-stage inverter circuit are driven. After that, the second-stage inverter circuit is driven, and then the third-stage inverter circuit is driven. Further, when the third-stage inverter circuit is driven, the gate voltage of the MOS transistor M20 increases, and the MOS transistor M20 is driven. When the MOS transistor M20 is driven, the ESD surge, which is supplied to the line L1, flows to the line L2 side, i.e., the ground potential section.

In FIG. 2, the path S11 shows a path in which ESD surge is caused to flow when the MOS transistor M20 of the global clamp section 14 is driven. Note that, as shown in FIG. 1, the plural-stage (three-stage, etc.) inverter circuits are connected with each other. Because of this, the MOS transistor M20, i.e., a protective device, is driven properly. Note that the global clamp section 14 may only include a one-stage inverter circuit.

As described above, when the global clamp section 14 is driven, the entire circuit is protected. Further, at the time of ESD surge generation, the gate voltage V1 of the MOS transistors M11 and M12 of the protected circuit 12 also increases.

When the gate voltage V1 increases, the MOS transistor M13 of the local clamp section 13 starts bipolar operation. The MOS transistor M13 becomes low in resistance. As a result, as shown in FIG. 2, the current flows in the path S12. In the path S12, the current flows from the signal source 11 via the MOS transistor M13 to the line L2, which is the ground potential section GND.

Here, in the configuration of FIG. 1, the line L3 connects the output section of the third-stage inverter circuit of the global clamp section 14 and the gate of the MOS transistor M13 of the local clamp section 13. Because of this, at the time of ESD surge generation, the local clamp section 13 is driven reliably. That is, ESD surge is supplied to the global clamp section 14. The output potential of the third-stage inverter circuit increases. As shown in the path S13 of FIG. 2, the output potential of the third-stage inverter circuit is transmitted to the gate of the MOS transistor M20. The gate potential of the MOS transistor M20 increases. As a result, the channel of the MOS transistor M20 opens, the surge current thus flows, and the global clamp section 14 is driven. Further, as shown by the path S14, the gate potential of the MOS transistor M20 is transmitted to the gate of the MOS transistor M13. Note that the line L3 connects the gate of the MOS transistor M20 and the gate of the MOS transistor M13. In response, the gate voltage of the MOS transistor M13 increases.

As described above, at the time of ESD surge generation, the gate voltage of the MOS transistor M13 increases. As a result, when the MOS transistor M13 of the local clamp section 13 starts bipolar operation, the drain potential may decrease. Because of this, at the time of ESD surge generation, as shown by the path S12 of FIG. 2, the ESD surge flows from the signal source 11 side via the MOS transistor M13 to the line L2 side, which is the ground potential GND. Because the MOS transistor M13 is driven, the MOS transistors M11 and M12 of the protected circuit 12 may be protected reliably.

Figure 3:
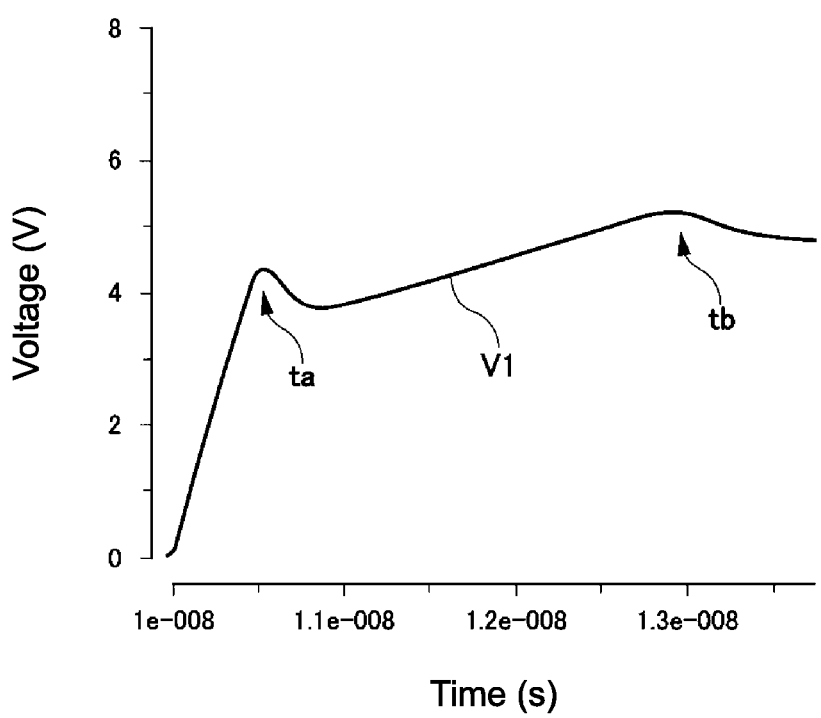
FIG. 3 is a diagram showing characteristics of changes of the voltage values of the example of FIG. 1.

FIG. 3 shows an example of change of the gate voltage V1 of the MOS transistors M11 and M12 of the protected circuit 12 at the time of ESD surge generation. In FIG. 3, the vertical axis shows voltage values, and the horizontal axis shows time.

FIG. 3 shows the change property of the voltage V1. At the time (ta) when the voltage reaches about 4 V, the channel of the MOS transistor M20 of the global clamp section 14 opens. The voltage slightly decreases temporarily. Here, in the case where ESD surge discharge is not enough, the voltage V1 then increases again gradually. At the time (tb) when the voltage reaches about 5 V, the MOS transistor M13 of the local clamp section 13 starts bipolar operation. The increase of the voltage V1 thus stops.

Here, let's assume that the line L3 does not connect the gate of the MOS transistor M13 of the local clamp section 13 and the global clamp section 14 side. In this case, the time when the MOS transistor M13 is turned on may be behind the time tb. If the time when the MOS transistor M13 is turned on is behind the time tb, the local clamp section 13 may not protect the devices of the protected circuit 12. However, the circuit configuration of FIG. 1 does not have such a trouble.

[1-3. Modification 1]

Figure 4:
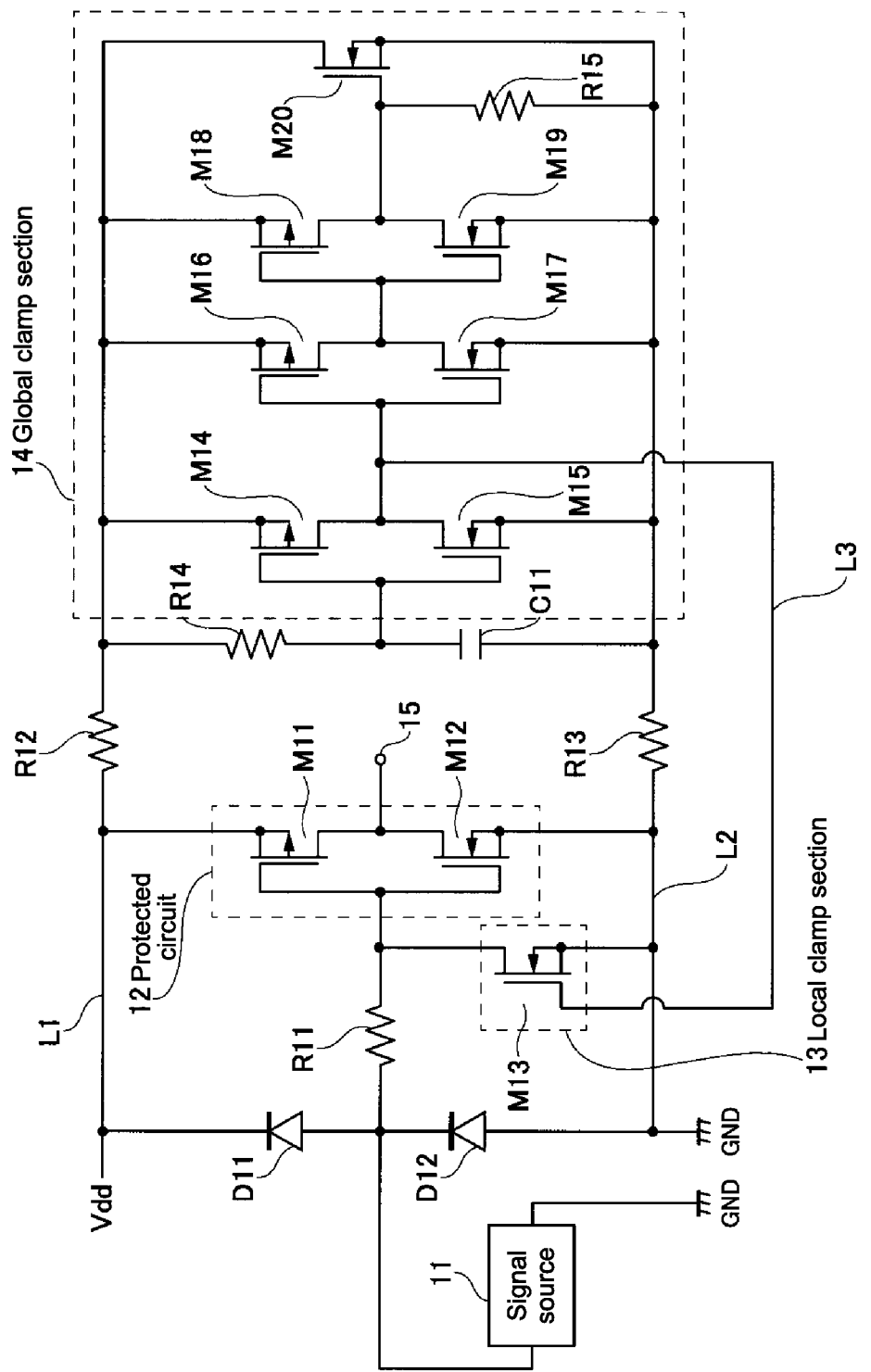
FIG. 4 is a circuit diagram of the first embodiment (modification 1) of the present disclosure.

FIG. 4 shows the modification 1 of the circuit configuration of FIG. 1.

In the example of FIG. 4, the line L3 connects the drain of the MOS transistors M14 and M15 with the gate of the MOS transistor M13 of the local clamp section 13. Here, the drain of the MOS transistors M14 and M15 is the output section of the first-stage inverter circuit of the global clamp section 14.

The circuit of FIG. 4 is similar to the circuit of FIG. 1 except for the above-mentioned configuration.

The configuration of FIG. 4 is similar to the example of FIG. 1. That is, at the time of ESD surge generation, the gate voltage of the MOS transistor M13 of the local clamp section 13 may increase. Further, the MOS transistor M13 may be driven successfully, and may protect the protected circuit 12.

[1-4. Modification 2]

Figure 5:
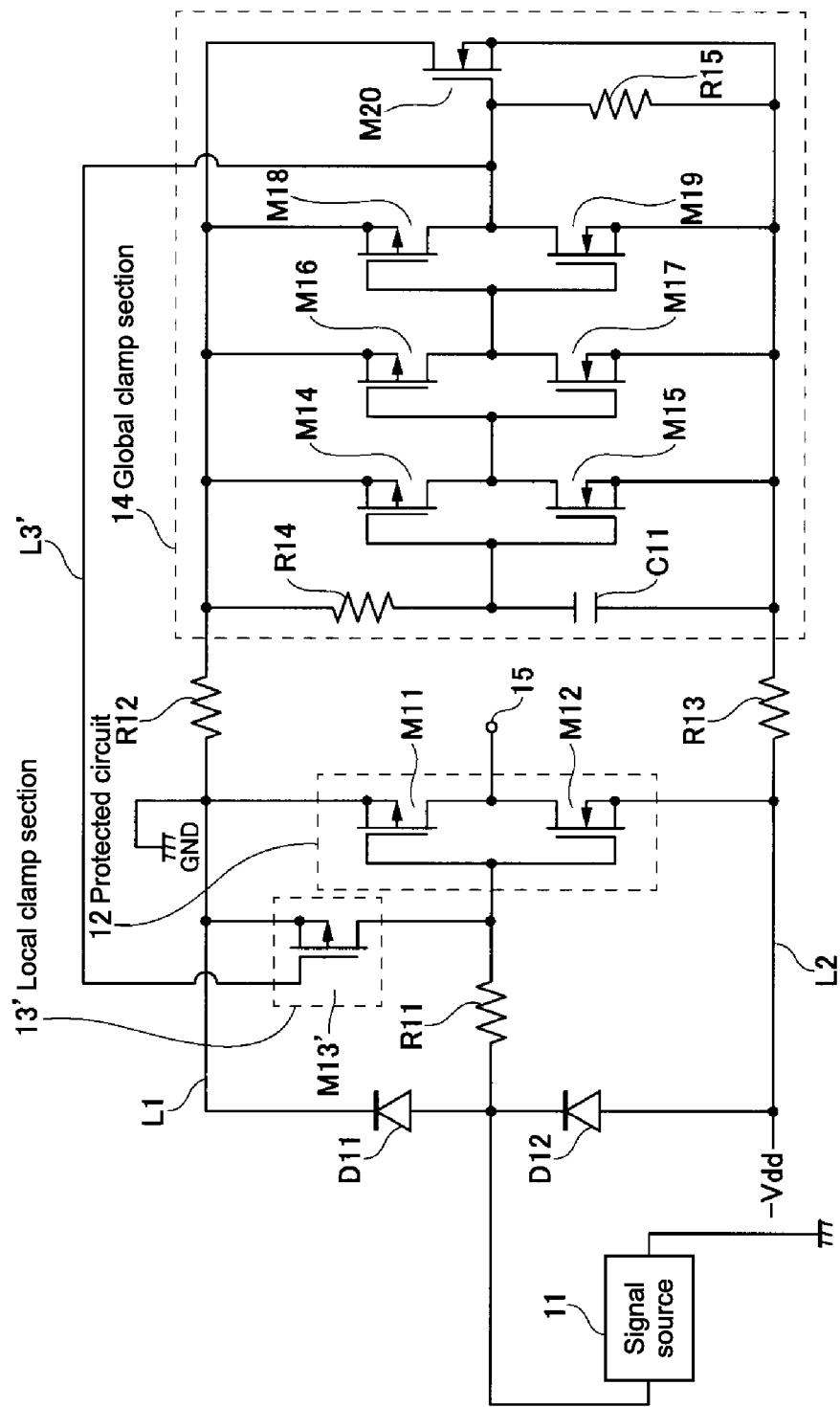
FIG. 5 is a circuit diagram of the first embodiment (modification 2) of the present disclosure.

FIG. 5 shows the modification 2 of the circuit configuration of FIG. 1.

FIG. 5 shows the following example. That is, the line L1 is the ground potential GND. The line L2 is –Vdd. The local clamp section 13' is between the line L1, which is the ground potential GND, and the gate of the MOS transistors M11 and M12.

That is, FIG. 1 shows the following example. That is, the local clamp section 13 is between the gate of the MOS transistors M11 and M12, and the line L2. To the contrary, in FIG. 5, the P-channel MOS transistor M13', i.e., the local clamp section 13', is between the gate of the MOS transistors M11 and M12 and the line L1.

Specifically, connection of the MOS transistor M13' is as follows. That is, the source of the MOS transistor M13' is connected with the line L1. The drain of the MOS transistor M13' is connected with the gate of the MOS transistors M11 and M12. Further, the gate of the MOS transistor M13' is connected with the line L3'. The line L3' is connected with the gate of the MOS transistor M20. Here, the gate of the MOS transistor M20 is the output section of the third-stage inverter circuit of the global clamp section 14. The line L3' may connect the gate of the MOS transistor M13' and the output section of another inverter circuit, as shown in the example of FIG. 4.

Also in the configuration of FIG. 5, at the time of ESD surge generation, the gate voltage of the MOS transistor M13' of the local clamp section 13' may increase. The MOS transistor M13' may thus be driven successfully.

In the configuration of FIG. 5, at the time of ESD surge generation, the voltage, which is supplied to the gate of the MOS transistors M11 and M12, flows from the MOS transistor M13' to the line L1. Further, the voltage flows from the line L1 via the global clamp section 14 to the ground potential section GND side. As a result, the MOS transistors M11 and M12 of the protected circuit 12 may be protected.

[1-5. Modification 3]

Figure 6:
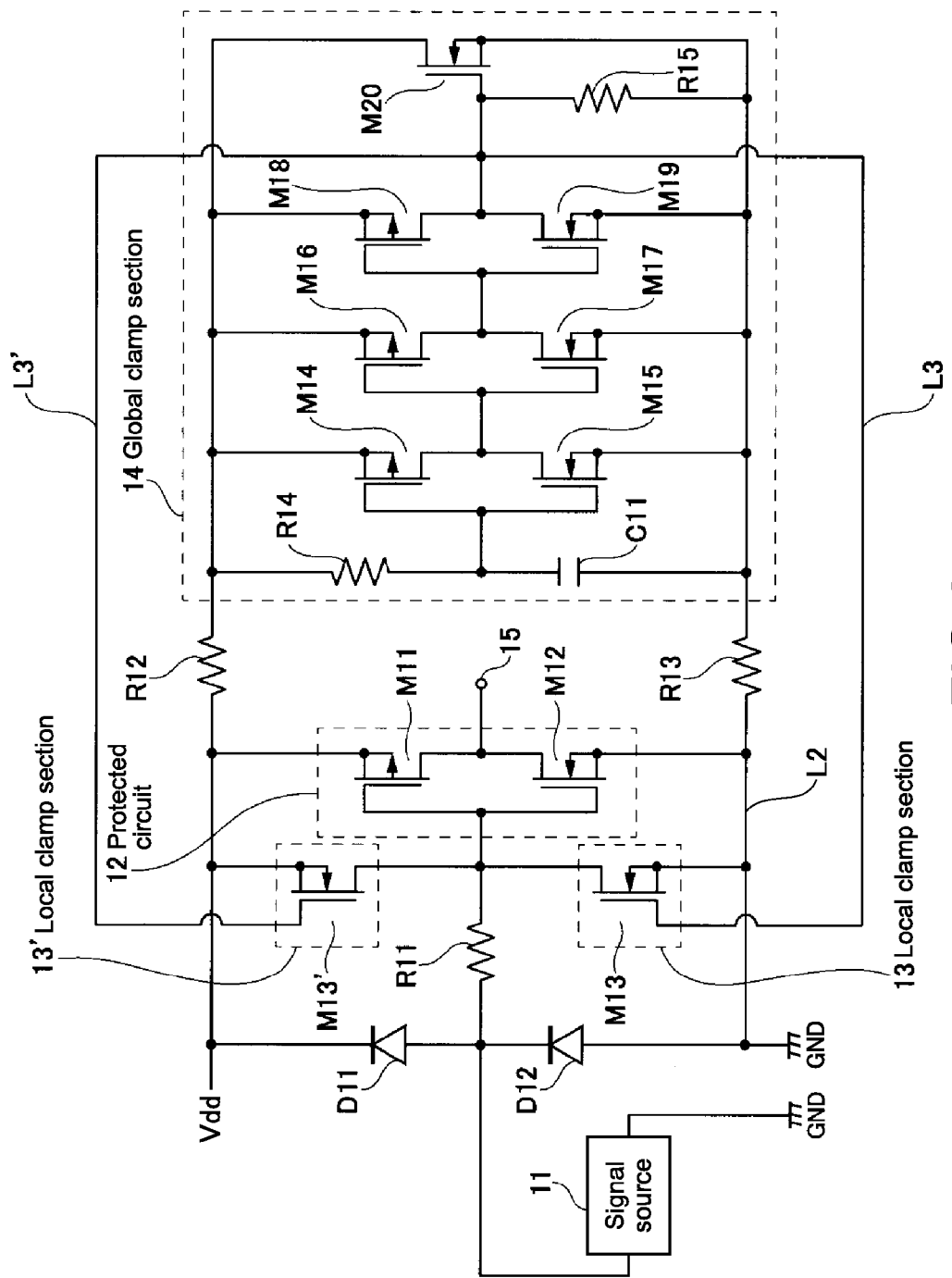
FIG. 6 is a circuit diagram of the first embodiment (modification 3) of the present disclosure.

FIG. 6 shows the modification 3 of the circuit configuration of FIG. 1.

The example of FIG. 6 includes both the local clamp section 13 of FIG. 1 and the local clamp section 13' of FIG. 5. That is, the MOS transistor M13 of the local clamp section 13 is connected between the gate of the MOS transistors M11 and M12, and the line L2, which is the ground potential GND. Further, the MOS transistor M13' of the local clamp section 13' is connected between the gate of the MOS transistors M11 and M12, and the line L1, which is the power-supply voltage Vdd.

Further, the line L3 connects the gate of the MOS transistor M13 of the local clamp section 13 and the gate of the MOS transistor M20 of the global clamp section 14. The line L3' connects the gate of the MOS transistor M13' of the local clamp section 13' and the gate of the MOS transistor M20 of the global clamp section 14.

The example of FIG. 6 includes the two local clamp sections 13, 13'. Because of this, the example of FIG. 6 may protect the devices of the protected circuit 12 more reliably.

<2. Second Embodiment>

[2-1. Circuit Configuration]

Next, the second embodiment of the present disclosure will be described with reference to FIG. 7 to FIG. 9.

Figure 7:
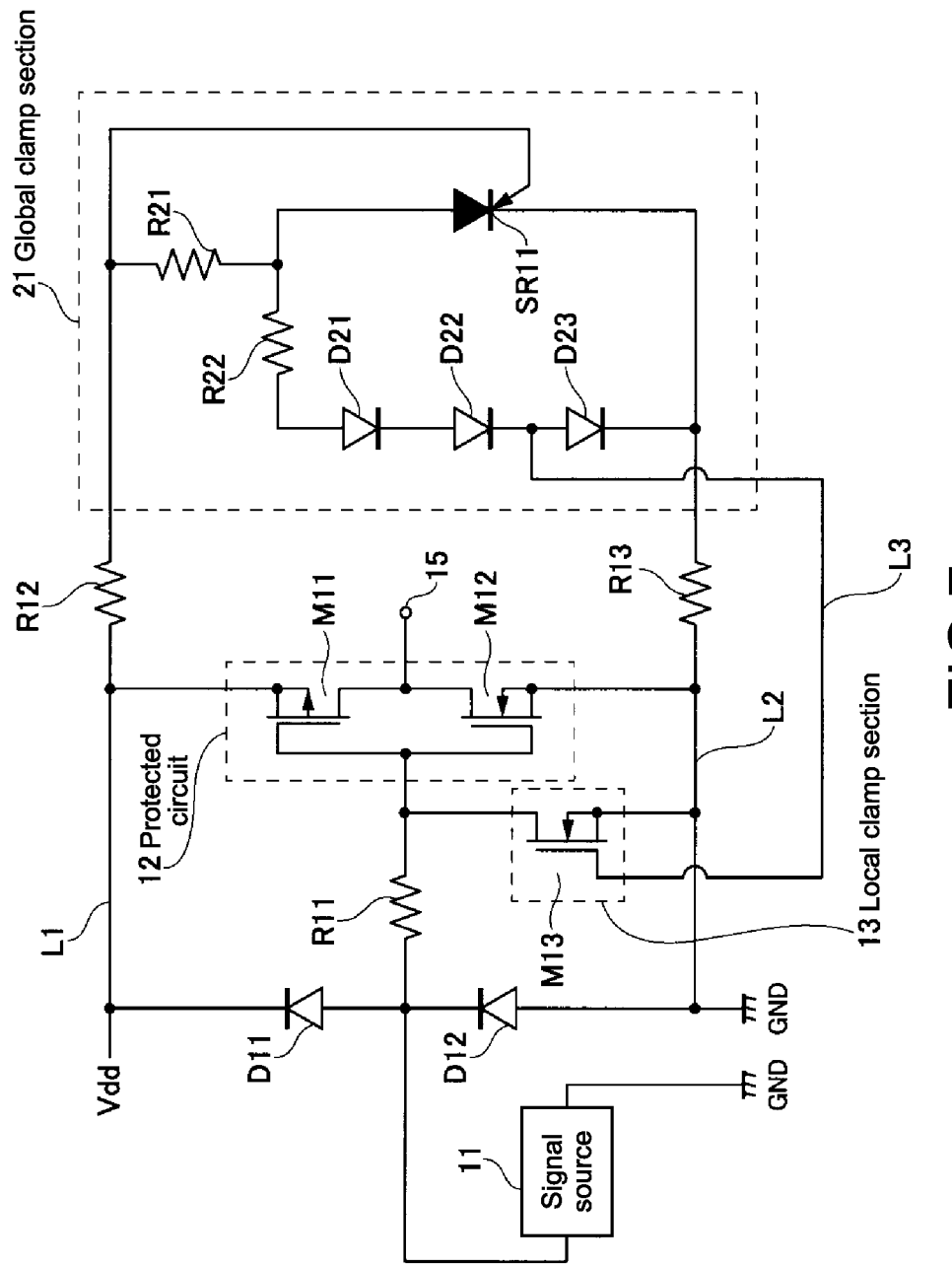
FIG. 7 is a circuit diagram of the second embodiment of the present disclosure.

FIG. 7 is a circuit diagram of the second embodiment. The circuit of FIG. 7 is embedded in a semiconductor device such as, for example, an LSI.

The configuration of the global clamp section of the circuit of FIG. 7 is different from that of the first embodiment. That is, as shown in FIG. 7, the global clamp section 21 is between the line L1, which is the power-supply voltage Vdd, and the line L2, which is the ground potential GND. The global clamp section 21 includes the thyristor SR11.

The anode of the thyristor SR11 is connected with the resistor R21. The resistor R21 is connected with the line L1. Further, the cathode of the thyristor SR11 is connected with the line L2, which is the ground potential GND. Further, the gate of the thyristor SR11 is connected with the line L1.

Further, a series circuit is connected between the connection point of the resistor R21 and the thyristor SR11, and the line L2, which is the ground potential GND. The series circuit includes the one resistor R22 and the three diodes D21, D22, and D23.

Further, the connection point of the diode D22 and the diode D23 is connected with the line L3. The line L3 is connected with the gate of the MOS transistor M13 of the local clamp section 13. The configuration of the local clamp section 13 is similar to that of FIG. 1. The configuration of the protected circuit 12 is similar to that of FIG. 1.

[2-2. Behaviors at the Time of ESD Surge Generation]

Figure 8:
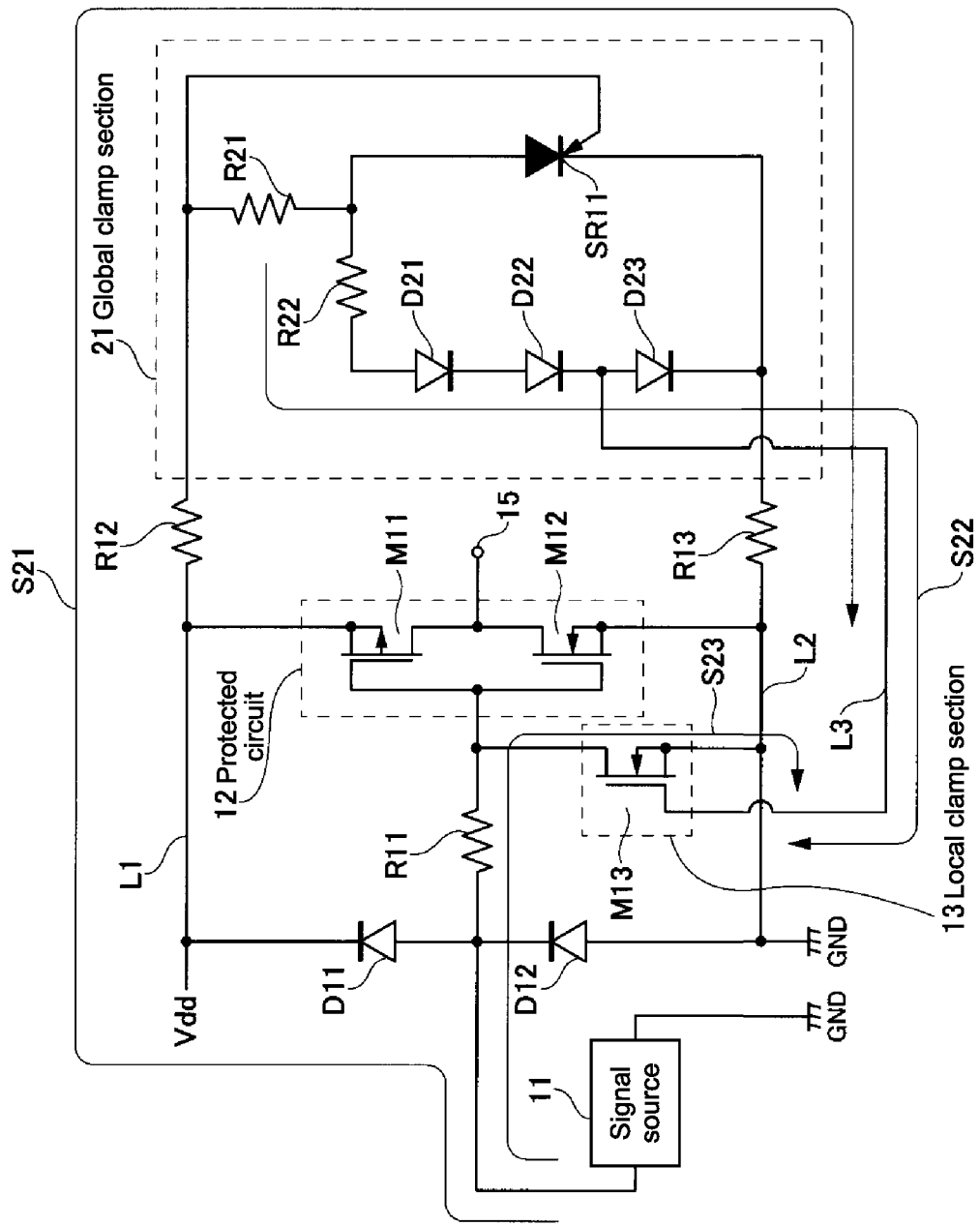
FIG. 8 is a diagram showing a driving status of the example of FIG. 7.

FIG. 8 shows the state where ESD surge is caused to flow in the global clamp section 21 and the local clamp section 13 of the circuit of the example of FIG. 7, at the time of ESD surge generation, with reference to the signal paths S21 to S23.

ESD surge is supplied to the line L1, which is the power-supply voltage Vdd. As a result, the voltage of the line L1 increases. At that time, the increased voltage is transmitted to the global clamp section 21. The thyristor SR11, i.e., the protective device, of the global clamp section 21 is turned on. When the thyristor SR11 is turned on, the ESD surge, which is supplied to the line L1, flows to the line L2 side, which is the ground potential section.

In FIG. 8, the path S21 shows the following path. That is, the thyristor SR11 of the global clamp section 21 is driven, and ESD surge is caused to flow.

As described above, the global clamp section 21 is driven. Because of this, the entire circuit is protected. Further, at the time of ESD surge generation, the gate voltage V1 of the MOS transistors M11 and M12 of the protected circuit 12 also increases.

When the gate voltage V1 increases, the MOS transistor M13 of the local clamp section 13 is turned on. When the MOS transistor M13 is turned on, as shown in FIG. 8, the signal flows in the path S23. In the path S23, the signal flows from the signal source 11 via the MOS transistor M13 to the line L2, which is the ground potential section GND.

Here, in the configuration of FIG. 7 or FIG. 8, the line L3 connects the output section of the diode D22 of the global clamp section 21 and the gate of the MOS transistor M13 of the local clamp section 13. Because of this, at the time of ESD surge generation, the local clamp section 13 is driven reliably. That is, ESD surge is supplied to the global clamp section 21. The output potential of the diode D22 thus increases. In response, the gate voltage of the MOS transistor M13 increases. Here, the line L3 connects the diode D22 and the MOS transistor M13.

As described above, at the time of ESD surge generation, the gate voltage of the MOS transistor M13 increases. Because of this, the potential of the drain may decrease when the MOS transistor M13 of the local clamp section 13 starts bipolar operation. Because of this, at the time of ESD surge generation, as shown by the path S23 of FIG. 8, ESD surge from the signal source 11 side flows via the MOS transistor M13 to the line L2 side, which is the ground potential GND. Because the MOS transistor M13 is driven, the MOS transistors M11 and M12 of the protected circuit 12 may be protected reliably.

[2-3. Modification 1]

Figure 9:
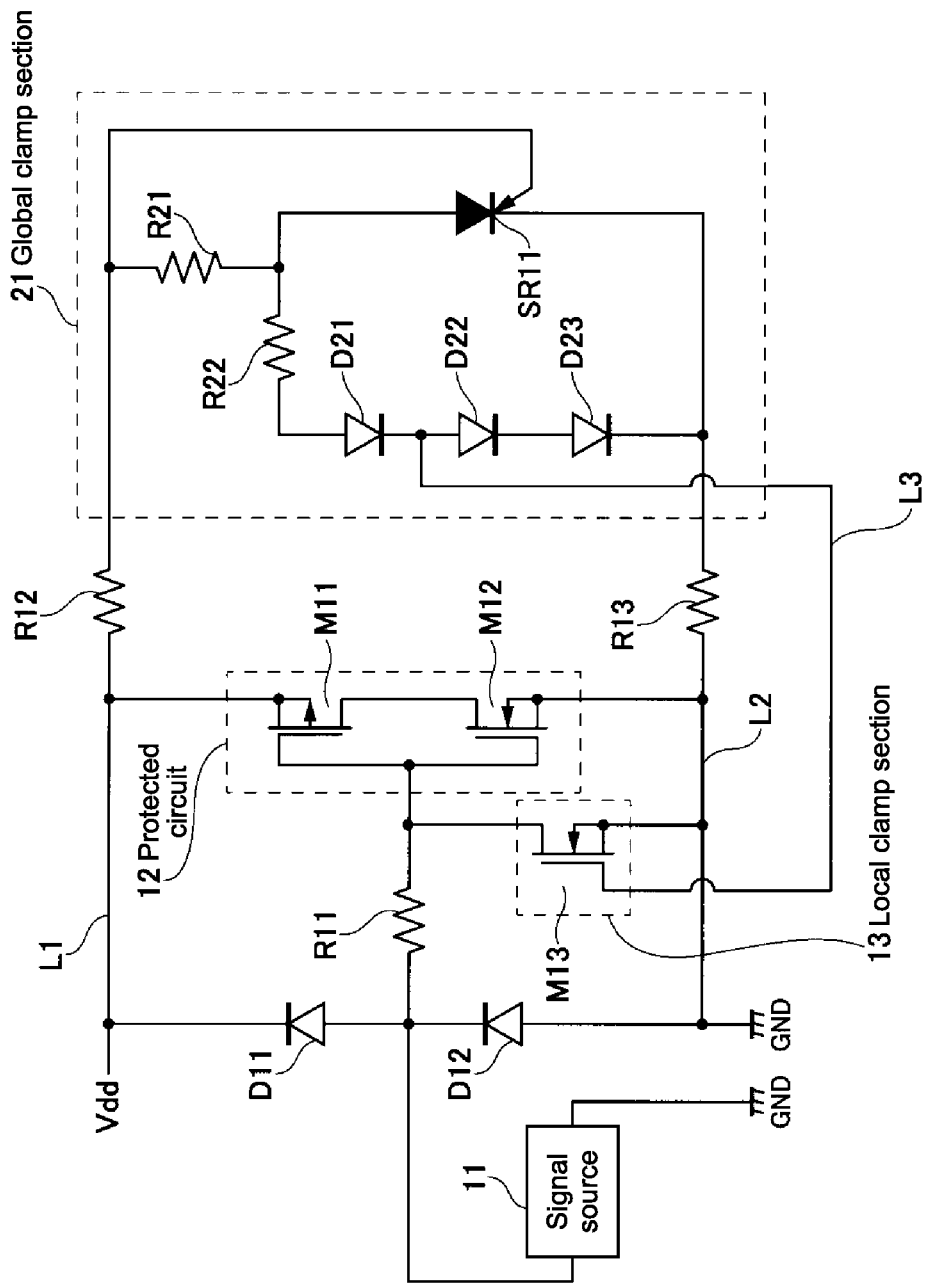
FIG. 9 is a circuit diagram of the second embodiment (modification 1) of the present disclosure.

FIG. 9 shows the modification 1 of the circuit configuration of FIG. 7.

FIG. 9 shows the following example. That is, the line L3 connects the output section of the diode D21 and the gate of the MOS transistor M13. Here, the three diodes D21, D22, and D23 are connected in series in the global clamp section 21.

As described above, one diode, which is connected with the line L3, is selected from the three diodes D21, D22, and D23, which are connected in series. As a result, the gate voltage of the MOS transistor M13 may be designed at the time of ESD surge generation. A device to be connected is selected in this manner. Behaviors at the time of ESD surge generation may be more reliable.

<3. Third Embodiment>

[3-1. Circuit Configuration]

Next, with reference to FIG. 10 to FIG. 12, the third embodiment of the present disclosure will be described.

Figure 10:
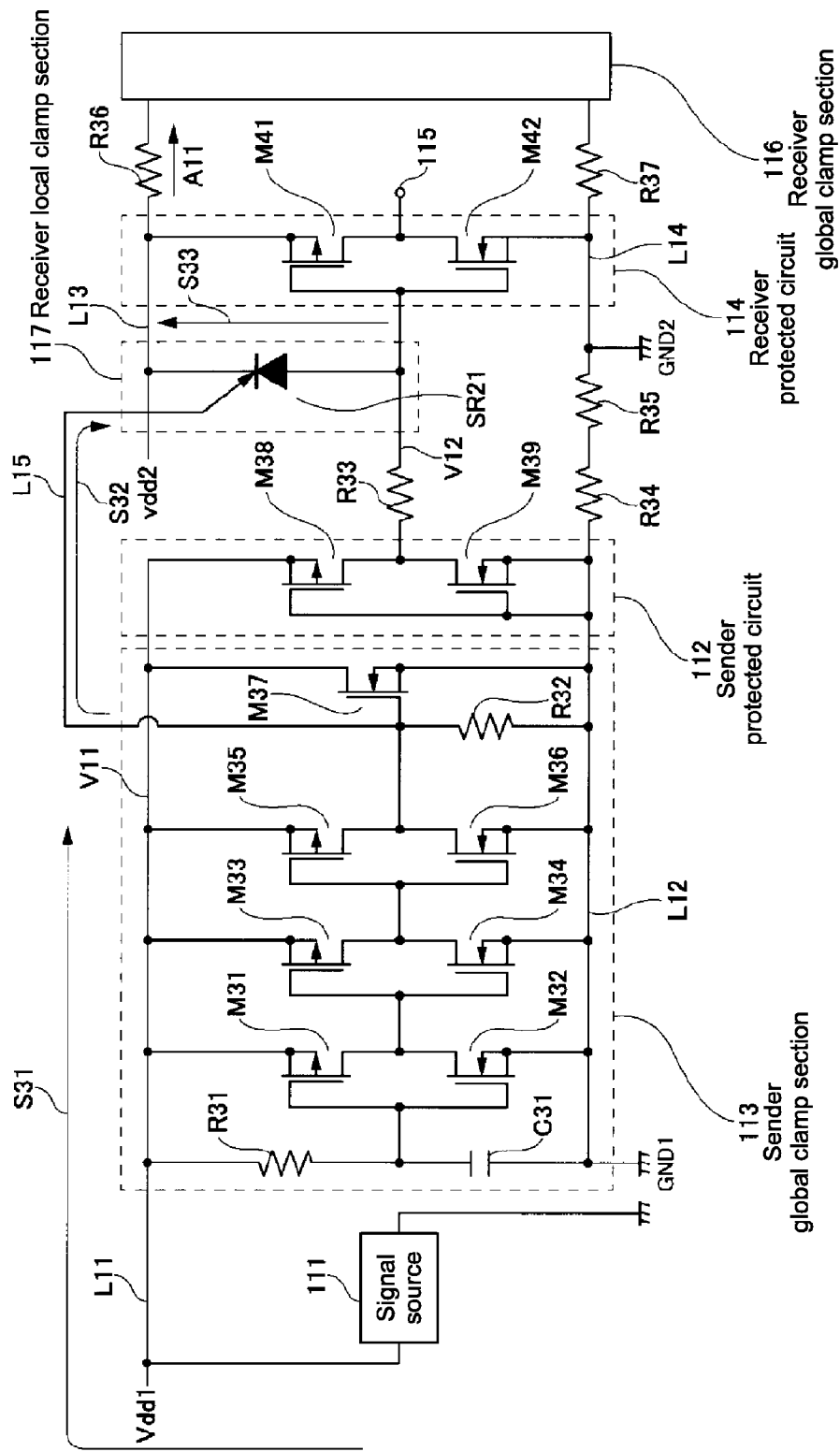
FIG. 10 is a circuit diagram of the third embodiment of the present disclosure.

FIG. 10 is a circuit diagram of the third embodiment. The circuit of FIG. 10 is embedded in a semiconductor device such as, for example, an LSI.

In the example of FIG. 10, the circuit includes the sender protected circuit 112 and the receiver protected circuit 114. The sender protected circuit 112 sends the signal, which is supplied from the signal source 111. The signal, which is sent from the sender protected circuit 112, is input in the receiver protected circuit 114. Further, the sender global clamp section 113 is provided for the sender protected circuit 112. The receiver global clamp section 116 is provided for the receiver protected circuit 114.

That is, the sender protected circuit 112 sends the signal, which is supplied from the signal source 111. The sender protected circuit 112 is an inverter circuit, which includes the MOS transistors M38 and M39. The sender global clamp section 113 protects the inverter circuit.

The source of the P-channel MOS transistor M38 is connected with the line L11, which is the power-supply voltage Vdd1. The drain of the MOS transistor M38 is connected with the drain of the N-channel MOS transistor M39. The source of the MOS transistor M39 is connected with the line L12, which is the ground potential GND1.

The sender global clamp section 113 will be described. A series circuit is connected between the line L11 and the line L12. The series circuit includes the resistor R31 and the capacitor C31. Further, the connection point of the resistor R31 and the capacitor C31 is connected with the gate of the MOS transistors M31 and M32. Here, the first-stage inverter circuit includes the MOS transistors M31 and M32. Further, the drain of the MOS transistors M31 and M32 of the first-stage inverter circuit is connected with the gate of the MOS transistors M33 and M34 of the second-stage inverter circuit. Further, the drain of the MOS transistors M33 and M34 of the second-stage inverter circuit is connected with the gate of the MOS transistors M35 and M36 of the third-stage inverter circuit. The source of the MOS transistor M31 of the first-stage inverter circuit, the source of the MOS transistor M33 of the second-stage inverter circuit, and the source of the MOS transistor M35 of the third-stage inverter circuit are connected with the line L11. The source of the MOS transistor M32 of the first-stage inverter circuit, the source of the MOS transistor M34 of the second-stage inverter circuit, and the source of the MOS transistor M36 of the third-stage inverter circuit are connected with the line L12.

Further, the drain of the MOS transistors M35 and M36 of the third-stage inverter circuit is connected with the gate of the N-channel MOS transistor M37, which is the protective device.

The drain of the MOS transistor M37 is connected with the line L11. The source of the MOS transistor M37 is connected with the line L12. Further, the gate of the MOS transistor M37 is connected with the resistor R32. The resistor R32 is connected with the line L12. When the MOS transistor M37 is turned on, ESD surge, which is supplied to the line L11, flows to the line L12 side, which is the ground potential section. As a result, the devices of the sender protected circuit 112 are protected.

Further, the drain of the MOS transistors M38 and M39 of the sender protected circuit 112 is connected with the resistor R33. The resistor R33 is connected with the gate of the MOS transistors M41 and 42 of the receiver protected circuit 114. The P-channel MOS transistor M41 and the N-channel MOS transistor M42 forms an inverter circuit. That is, the source of the P-channel MOS transistor M41 is connected with the line L13, which is the power-supply voltage Vdd2. The drain of the MOS transistor M41 is connected with the drain of the N-channel MOS transistor M42. Further, the source of the MOS transistor M42 is connected with the line L14, which is the ground potential GND2. The terminal 115 is connected with the drain of the MOS transistors M41 and M42. The terminal 115 outputs the signal, which is input in the receiver protected circuit 114.

Note that the resistors R34 and R35 are connected between, in series, the sender protected circuit 112 of the line L12 and the receiver protected circuit 114. Further, the power source of the power-supply voltage Vdd2 of the receiver is different from the power source of the power-supply voltage Vdd1 of the sender.

The receiver protected circuit 114 is connected with the receiver global clamp section 116, and with the receiver local clamp section 117. The receiver global clamp section 116 is connected with the resistor R36, and the resistor R36 is connected with the line L13, which is the power-supply voltage Vdd2. The receiver global clamp section 116 is connected with the resistor R37, and the resistor R37 is connected with the line L14, which is the ground potential GND2. FIG. 10 omits the circuit configuration of the receiver global clamp section 116.

The receiver local clamp section 117 includes the thyristor SR21, i.e., the protective device. The anode of the thyristor SR21 is connected with the gate of the MOS transistors M41 and M42. The cathode of the thyristor SR21 is connected with the line L13, which is the power-supply voltage Vdd2.

Further, the gate of the thyristor SR21 is connected with the line L15. The line L15 is connected with the gate of the MOS transistor M37 of the sender global clamp section 113.

[3-2. Behaviors at the Time of ESD Surge Generation]

Next, behaviors of the circuit of FIG. 10 at the time of ESD surge generation will be described.

In FIG. 10, ESD surge is caused to flow in the signal paths S31 to S33.

ESD surge is supplied to the line L11, which is the power-supply voltage Vdd1. The voltage of the line L11 increases. At that time, the increased voltage is transmitted to the sender global clamp section 113. The MOS transistor M37 of the sender global clamp section 113 is turned on. Here, the MOS transistor M37 is the protective device.

When the MOS transistor M37 is driven, as shown by the path S31, the surge voltage, which is supplied to the line L11, is caused to flow to the line L12 side, which is the ground potential GND1, via the MOS transistor M37, which is turned on. The sender protected circuit 112 is thus protected.

Further, in the state where the MOS transistor M37 is turned on, the gate voltage of the MOS transistor M37 increases. As shown by the path S32, the gate voltage of the MOS transistor M37 is transmitted to the gate of the thyristor SR21 via the line L15. As a result, the receiver local clamp section 117 is driven. The surge voltage is caused to flow in the path S33. In the path S33, the surge voltage is caused to flow from the gate of the MOS transistors M41 and M42 of the receiver protected circuit 114 to the line L13, which is the power-supply voltage Vdd2. Further, the receiver global clamp section 116 is driven. As a result, the surge voltage, which is caused to flow from the thyristor SR21 to the line L13, flows to the ground potential GND2 side.

As described above, the increased voltage, which results from the ESD surge, is transmitted from the sender protected circuit 112 to the receiver protected circuit 114. Also in this case, the receiver local clamp section 117 protects the receiver protected circuit 114. The receiver protected circuit 114 is protected reliably. That is, the gate of the thyristor SR21, i.e., the protective device, of the receiver local clamp section 117 is connected with the line L15. The line L15 is connected with the gate of the protective device of the sender global clamp section 113. Because of this, the thyristor SR21 is driven promptly at the time of ESD surge generation. Because of this, at the time of ESD surge generation, the thyristor SR21 is driven without any delay. The protected device is protected reliably.

Figure 11A:
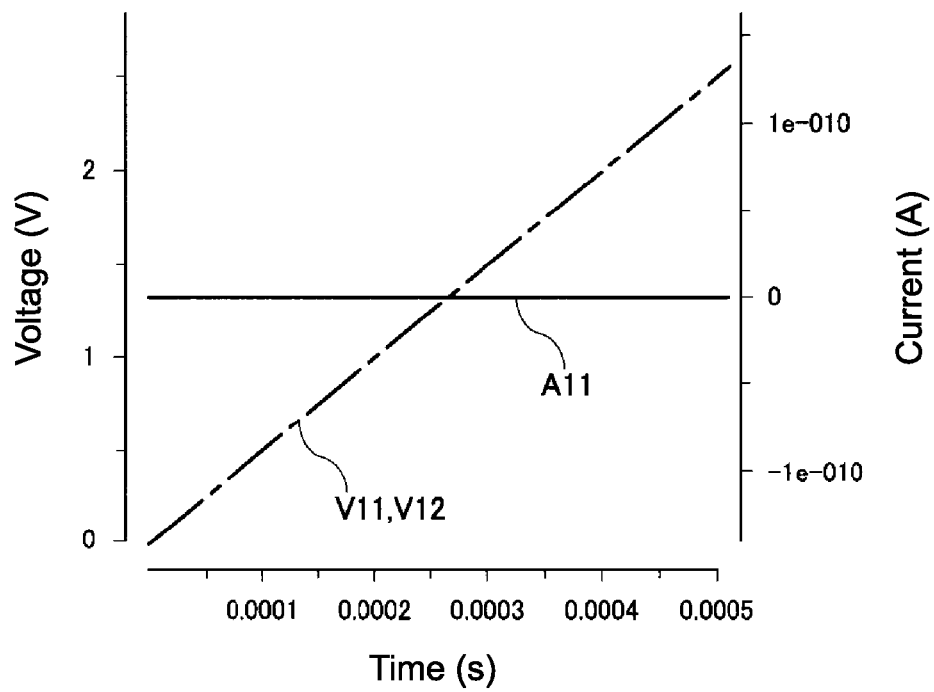
FIG. 11 are diagrams showing characteristics of changes of the voltage values of the example of FIG. 10.
Figure 11B:
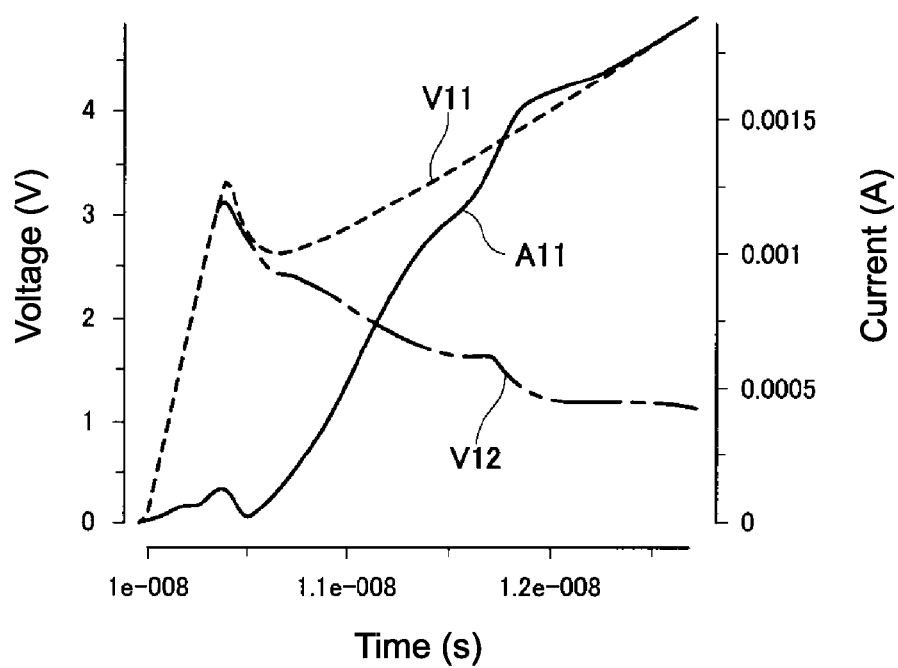

FIG. 11A shows characteristics of an example of changes of the voltage values and the current value of the respective sections of the circuit of FIG. 10 under the normal condition. FIG. 11B shows characteristics of an example of changes of the voltage values and the current value of the respective sections of the circuit of FIG. 10 at the time of ESD surge generation. In FIG. 11, the voltage V11 shows the voltage of the line L11. The voltage V12 shows the voltage of the gate of the MOS transistors M41 and M42 of the receiver protected circuit 114. Further, the current A11 shows the current, which flows in the resistor R36.

FIG. 11A shows the normal condition in which the voltage is equal to or less than about 2 V. As shown in FIG. 11A, under the normal condition, when the voltage V11 of the line L11 increases, the gate voltage V12 of the MOS transistors M41 and M42 also increases in response. Under the normal condition, the protective circuit is not driven. Because of this, the current A11, which flows in the resistor R36, is 0 A.

Further, as shown in FIG. 11B, the voltage V11 of the line L11 exceeds 3V. At that time, the sender global clamp section 113 is driven, and suppresses the increase in the voltage V11 of the line L11. Further, the receiver local clamp section 117 is also driven. The gate voltage V12 of the MOS transistors M41 and M42 decreases. The receiver local clamp section 117 protects the MOS transistors M41 and M42. When the receiver local clamp section 117 protects the MOS transistors M41 and M42, as shown in FIG. 11B, the current A11 flows in the resistor R36.

[3-3. Modification 1]

Figure 12:
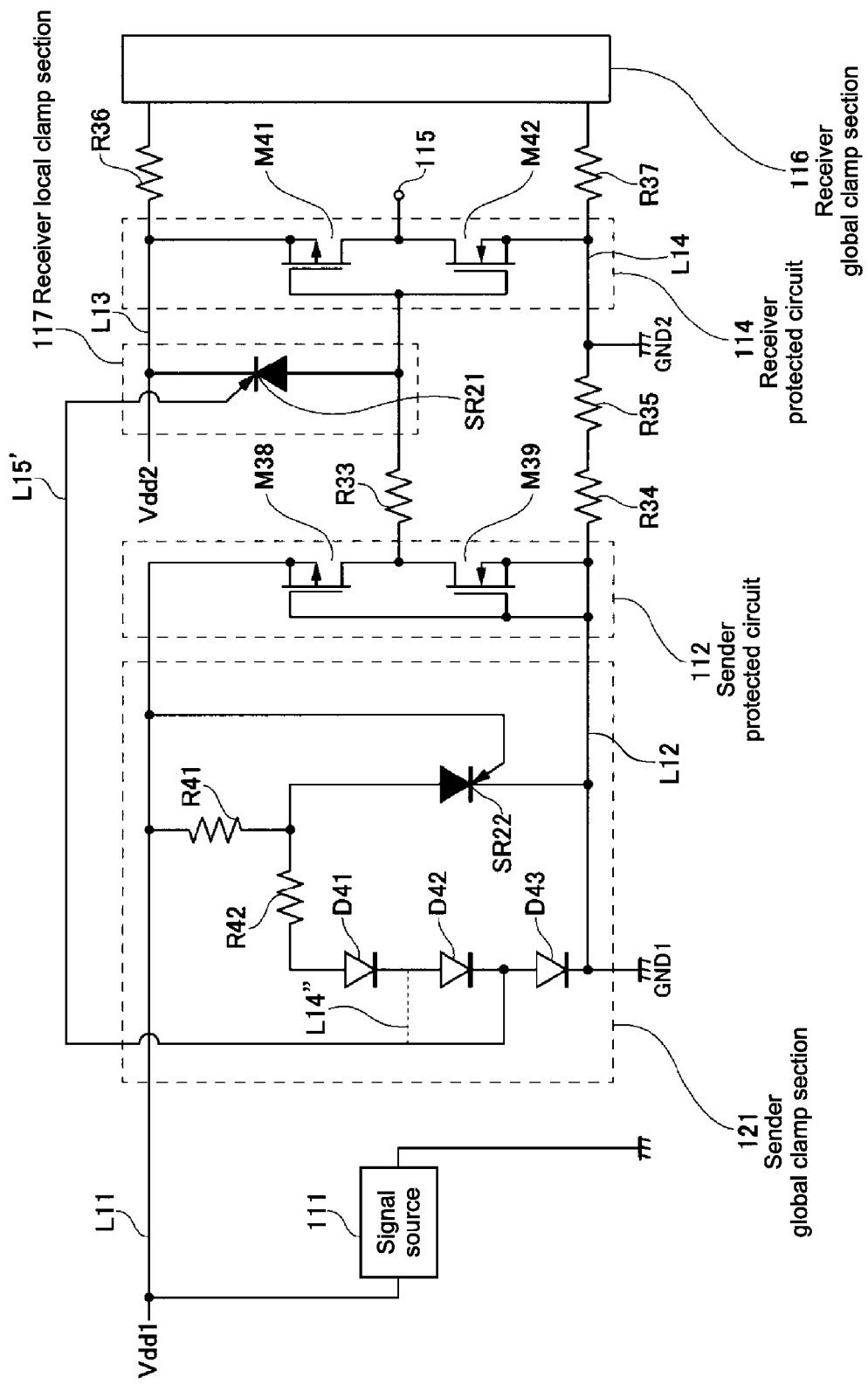
FIG. 12 is a circuit diagram of the third embodiment (modification 1) of the present disclosure.

FIG. 12 shows the modification 1 of the circuit configuration of FIG. 10.

In the configuration of FIG. 12, the sender global clamp section 121 includes the thyristor SR22.

That is, as shown in FIG. 12, the sender global clamp section 121 is between the line L11, which is the power-supply voltage Vdd1, and the line L12, which is the ground potential GND1. The sender global clamp section 121 includes the thyristor SR22.

The anode of the thyristor SR22 is connected with the resistor R41. The resistor R41 is connected with the line L11. Further, the cathode of the thyristor SR22 is connected with the line L12, which is the ground potential GND1. Further, the gate of the thyristor SR22 is connected with the line L11.

Further, a series circuit is connected between the connection point of the resistor R41 and the thyristor SR22, and the line L12, which is the ground potential GND1. The series circuit includes the one resistor R42 and the three diodes D41, D42, and D43.

Further, the connection point of the diodes D42 and the diode D43 is connected with the line L15'. The line L15' is connected with the gate of the thyristor SR21 of the receiver local clamp section 117. The configuration of FIG. 12 is similar to that of FIG. 10 except for the above-mentioned configuration.

As shown in FIG. 12, the sender global clamp section 121 includes the thyristor, i.e., a protective device. Also in this case, at the time of ESD surge generation, the voltage of the sender global clamp section 121 is transmitted to the gate of the thyristor SR21 of the receiver local clamp section 117. Because of this, similar to the example of FIG. 10, at the time of ESD surge generation, the thyristor SR21 is driven without any delay. The protected device is protected reliably.

Note that FIG. 12 may include the line L14". That is, the connection point of the diode D41 and the diode D42 may be connected with the line L14". The line L14" may be connected with the gate of the thyristor SR21 of the receiver local clamp section 117.

<4. Other Modifications>

The circuit diagrams of the above-mentioned embodiments are preferable examples. Circuits, which are different from the circuit diagrams shown in the drawings, may be configured insofar as they are within the scope of the present disclosure.

That is, other connection configuration may be employed insofar as they have the following configuration. That is, the gate of the protective device of the local clamp section may be connected with the spot, whose voltage increases when the global clamp section is driven. The protective device of the local clamp section is driven reliably at the time of ESD surge generation.

Further, similar to the example of FIG. 10, independent circuits (e.g., sender/receiver global clamp sections and sender/receiver local clamp sections) may be connected with each other. Alternatively, a power source, which drives a global clamp section, may be different from a power source, which drives a local clamp section.

Note that the present disclosure may employ the following configurations.

(1) A protective circuit, comprising:
a first clamp section connected between a first line and a second line, a power-supply voltage being supplied to the first line, the second line being the ground potential, the first clamp section including a first device, the first device being configured to be driven in a case where a voltage value of the first device exceeds a predetermined voltage value, the first clamp section being configured to cause a surge current flowing in the first line to flow to the second line when the first device is driven;
a second clamp section including a second device, the second device being connected with the gate of a protected device, the second clamp section being configured to cause a surge current supplied to the gate of the protected device to flow to one of the first line and the second line when the second device is driven; and
a third line connecting a predetermined spot of the first clamp section and the gate of the second device of the second clamp section, whereby a gate voltage of the second device is equal to a potential of the predetermined spot.

(2) The protective circuit according to (1), wherein
the first clamp section includes
a detection circuit connected between the first line and the second line, the detection circuit being configured to detect a voltage of a signal input in the first line, and
a plural-stage inverter circuits connected between the first line and the second line, the plural-stage inverter circuits being configured to be driven in a case where the detection circuit detects the predetermined voltage value,
the first clamp section is configured to drive the first device by means of output of the final-stage inverter circuit out of the plural-stage of inverter circuits, and
the third line connects an output section of any one stage of inverter circuit out of the plural-stage inverter circuits and the gate of the second device of the second clamp section.

(3) The protective circuit according to (2), wherein
the third line connects an output section of the final-stage inverter circuit out of the plural-stage inverter circuits and the gate of the second device of the second clamp section.

(4) The protective circuit according to (2) or (3), wherein
the second clamp section includes one clamp section and another clamp section, the one clamp section being connected between the first line and the gate of the protected device, the other clamp section being connected between the second line and the gate of the protected device.

(5) The protective circuit according to (1), wherein
the first clamp section includes
a thyristor connected between the first line and the second line, the thyristor being driven by means of a signal voltage supplied to the first line, the thyristor being configured to cause a surge current flowing in the first line to flow to the second line, and
a plural-stage diodes, the plural-stage diodes and a resistance being connected with each other in series between the first line and the second line, and
the third line connects a midpoint of the plural-stage diodes and the gate of the second device of the second clamp section, the plural-stage diodes being connected with each other in series.

(6) The protective circuit according to any one of (1) to (5), wherein
a power source configured to supply power to the first line connected with the first clamp section is different from a power source configured to supply power to the first line connected with the second clamp section.

(7) The protective circuit according to any one of (1) to (3), wherein
the second clamp section is a thyristor connected between the gate of a protected device and the first line, and
the third line connects a predetermined spot of the first clamp section and the gate of the thyristor.

(8) The protective circuit according to any one of (1) to (7), wherein
the protected device is a MOS transistor configuring an inverter circuit.

(9) An electronic device, comprising:
a protected circuit connected between a first line and a second line, a power-supply voltage being supplied to the first line, the second line being the ground potential;
a first clamp section connected between the first line and the second line, the first clamp section including a first device, the first device being configured to be driven in a case where a voltage value of the first device exceeds a predetermined voltage value, the first clamp section being configured to cause a surge current flowing in the first line to flow to the second line when the first device is driven;
a second clamp section including a second device, the second device being connected with the gate of a protected device of the protected circuit, the second clamp section being configured to cause a surge current supplied to the gate of the protected device to flow to one of the first line and the second line when the second device is driven; and
a third line connecting a predetermined spot of the first clamp section and the gate of the second device of the second clamp section, whereby a gate voltage of the second device is equal to a potential of the predetermined spot.

(10) A method of driving a protective circuit, the protective circuit including a first clamp section and a second clamp section, the first clamp section including a first device, the first clamp section being configured to protect an entire protected circuit of a predetermined area when the first device is driven, the second clamp section including a second device, the second clamp section being configured to protect a predetermined device of the protected circuit when the second device is driven, the method comprising:
connecting a predetermined spot of the first clamp section and the gate of the second device of the second clamp section; and
causing the gate voltage of the second device to be the potential of the predetermined spot.

The present disclosure contains subject matter related to that disclosed in Japanese Priority Patent Application JP 2013-075998 filed in the Japan Patent Office on Apr. 1, 2013, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A protective circuit, comprising:
    a first clamp section connected between a first line and a second line, a power-supply voltage being supplied to the first line, the second line being the ground potential, the first clamp section including a first device, the first device being configured to be driven in a case where a voltage value of the first device exceeds a predetermined voltage value, the first clamp section being configured to cause a surge current flowing in the first line to flow to the second line when the first device is driven;
    a second clamp section including a second device, the second device being connected with the gate of a protected device, the second clamp section being configured to cause a surge current supplied to the gate of the protected device to flow to one of the first line and the second line when the second device is driven; and
    a third line connecting a predetermined spot of the first clamp section and the gate of the second device of the second clamp section, whereby a gate voltage of the second device is equal to a potential of the predetermined spot,
    wherein,
        the first clamp section includes (a) a thyristor connected between the first line and the second line, the thyristor being driven by means of a signal voltage supplied to the first line, the thyristor being configured to cause a surge current flowing in the first line to flow to the second line, and (b) a plural-stage diodes, the plural-stage diodes and a resistance being connected with each other in series between the first line and the second line, and
        the third line connects a midpoint of the plural-stage diodes and the gate of the second device of the second clamp section, the plural-stage diodes being connected with each other in series.

2. The protective circuit according to claim 1, wherein:
    the first clamp section includes (a) a detection circuit connected between the first line and the second line, the detection circuit being configured to detect a voltage of a signal input in the first line, and (b) a plural-stage inverter circuits connected between the first line and the second line, the plural-stage inverter circuits being configured to be driven in a case where the detection circuit detects the predetermined voltage value,
    the first clamp section is configured to drive the first device by means of output of the final-stage inverter circuit out of the plural-stage inverter circuits, and
    the third line connects an output section of any one stage of inverter circuit out of the plural-stage inverter circuits and the gate of the second device of the second clamp section.

3. The protective circuit according to claim 2, wherein the third line connects an output section of the final-stage inverter circuit out of the plural-stage inverter circuits and the gate of the second device of the second clamp section.

4. The protective circuit according to claim 2, wherein the second clamp section includes one clamp section and another clamp section, the one clamp section being connected between the first line and the gate of the protected device, the other clamp section being connected between the second line and the gate of the protected device.

5. The protective circuit according to claim 1, wherein a power source configured to supply power to the first line connected with the first clamp section is different from a power source configured to supply power to the first line connected with the second clamp section.

6. The protective circuit according to claim 5, wherein:
    the second clamp section is a thyristor connected between the gate of a protected device and the first line, and
    the third line connects a predetermined spot of the first clamp section and the gate of the thyristor.

7. The protective circuit according to claim 1, wherein the protected device is a MOS transistor configuring an inverter circuit.

8. An electronic device with a protected circuit connected between a first line and a second line, a power-supply voltage being supplied to the first line, the second line being the ground potential, the protective circuit comprising:
    a first clamp section connected between the first line and the second line, the first clamp section including a first device, the first device being configured to be driven in a case where a voltage value of the first device exceeds a predetermined voltage value, the first clamp section being configured to cause a surge current flowing in the first line to flow to the second line when the first device is driven;
    a second clamp section including a second device, the second device being connected with the gate of a protected device of the protected circuit, the second clamp section being configured to cause a surge current supplied to the gate of the protected device to flow to one of the first line and the second line when the second device is driven; and
    a third line connecting a predetermined spot of the first clamp section and the gate of the second device of the second clamp section, whereby a gate voltage of the second device is equal to a potential of the predetermined spot,
    wherein,
        the first clamp section includes (a) a thyristor connected between the first line and the second line, the thyristor being driven by means of a signal voltage supplied to the first line, the thyristor being configured to cause a surge current flowing in the first line to flow to the second line, and (b) a plural-stage diodes, the plural-stage diodes and a resistance being connected with each other in series between the first line and the second line, and
        the third line connects a midpoint of the plural-stage diodes and the gate of the second device of the second clamp section, the plural-stage diodes being connected with each other in series.

* * * * *